L. MOORE.
Grain-Drill.
No. 1,395.
Reissued Feb. 3, 1863.
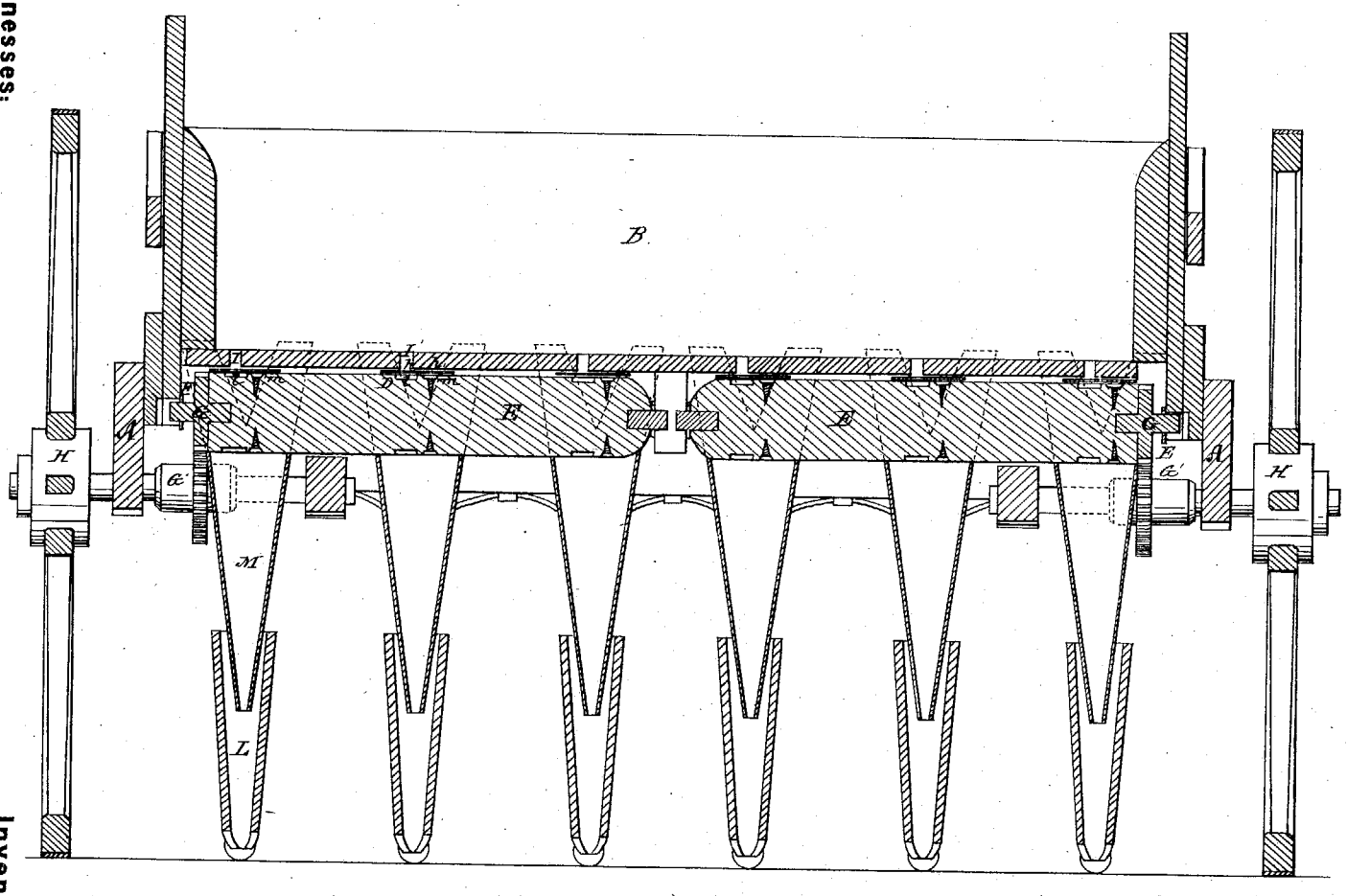
Witnesses:
Charles Smith
James H. Ondly
Inventor:
Lewis Moore
Per Albert Bee
Atty
A.M. PHOTO-LITHO. CO. N.Y. (OSBORNE'S PROCESS.)

UNITED STATES PATENT OFFICE.

LEWIS MOORE, OF YPSILANTI, MICHIGAN.

IMPROVEMENT IN GRAIN-DRILLS.

Specification forming part of Letters Patent No. 5,522, dated April 18, 1848; Reissue No. 1,395, dated February 3, 1863.

*To all whom it may concern:*

Be it known that I, LEWIS MOORE, (formerly of Bart, Pennsylvania,) now of Ypsilanti, in the county of Washtenaw and State of Michigan, have invented a new and useful Improvement in Grain-Drills; and I do hereby declare the following to be a full and exact description of the same, reference being had to the accompanying drawing, which is made a part of this specification, and which represents a vertical longitudinal section of a machine illustrating my said invention.

The subject of my present improvement is a device to regulate the quantity of seed-deposited, consisting of a perforated slide, adjustable to correspond with any suitable size or number of apertures or cavities in the hopper-bottom or other part of the machine, so as to suit any kind or quantity of seed to be sown, as will be hereinafter explained.

To enable others skilled in the art to which my invention appertains to fully understand and use the same, I will proceed to describe it and a manner in which it may be carried into effect.

The frame A, hopper G, wheels H, driving-gear G G′, conducting-tubes M, and drill-teeth L may be constructed and arranged in any suitable manner.

E E are sowing-cylinders, journaled in plates F beneath the hopper.

D D are staples secured beneath the hopper, curved to fit the cylinders E, and each perforated with two or more apertures, *h h′*, of different sizes corresponding with large and small cavities *l m* in the peripheries of the sowing-cylinders.

I is a perforated gage-plate fitted to slide within or above the staples D, so that its perforations I′ may be brought to correspond with any size or number of apertures in the staples, hopper-bottom, or other part of the machine.

In carrying out this invention according to the illustration here given the gage I is adjusted to the apertures and cavities in the staples D and cylinders which will correspond with the kind and quantity of seed to be sown, and as the machine is drawn over the ground the wheels H, acting through the medium of the gearing G G′, impart a continuous rotation to the cylinders E, and by this means the seed is deposited in the ground in any desired quantity through the conducting-tubes M and hollow drill-teeth L. The adjustment of the gage I may be effected by a screw or any other suitable means.

It will be manifest that the specific form of seeding mechanism herein represented is not essential to this invention, and also that the sliding gage I will operate with the same effect above or below a fixed or movable hopper-bottom or reciprocating slide as in connection with the separate staples D.

Having thus described my invention, what I claim as new therein, and desire to secure by Letters Patent, is—

The combination of the adjustable perforated gage-plate C with two or more holes or series of holes of different capacity, when the said gage-plate is so arranged as to cut off the flow of seed from one capacity of opening and transfer it to another, substantially as herein set forth.

LEWIS MOORE.

Witnesses:
F. F. BOGARDUS,
S. H. BOGARDUS.